(12) United States Patent
Otsuka et al.

(10) Patent No.: US 7,773,075 B2
(45) Date of Patent: Aug. 10, 2010

(54) DISPLAY APPARATUS

(75) Inventors: Masakazu Otsuka, Kanagawa (JP);
Takashi Kuwabara, Kanagawa (JP);
Toshitomo Umei, Kanagawa (JP);
Seiichi Nakagawa, Kanagawa (JP);
Hisaya Fukuda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 713 days.

(21) Appl. No.: 11/688,962

(22) Filed: Mar. 21, 2007

(65) Prior Publication Data

US 2007/0222769 A1    Sep. 27, 2007

Related U.S. Application Data

(60) Provisional application No. 60/877,007, filed on Dec. 26, 2006.

(30) Foreign Application Priority Data

Mar. 22, 2006    (JP) .............................. 2006-079779

(51) Int. Cl.
*G06F 3/041*    (2006.01)
(52) U.S. Cl. .......................................... 345/173; 345/7
(58) Field of Classification Search ......... 345/173–174, 345/7; 715/792, 803, 781; 701/200
See application file for complete search history.

(56) References Cited

U.S. PATENT DOCUMENTS

| 6,243,645 | B1 * | 6/2001 | Moteki et al. ................ 701/211 |
| 6,874,128 | B1 | 3/2005 | Moore et al. |
| 2003/0006892 | A1 * | 1/2003 | Church ........................ 340/439 |
| 2003/0007227 | A1 * | 1/2003 | Ogino ........................ 359/227 |
| 2005/0162405 | A1 * | 7/2005 | Ono et al. ................... 345/173 |
| 2005/0162406 | A1 * | 7/2005 | Ono et al. ................... 345/173 |
| 2005/0267676 | A1 * | 12/2005 | Nezu et al. .................. 701/200 |
| 2006/0020903 | A1 | 1/2006 | Wang et al. |

(Continued)

FOREIGN PATENT DOCUMENTS

EP    1205836    5/2002

(Continued)

OTHER PUBLICATIONS

U.S. Appl. No. 11/689,025 to Nakagawa et al., filed Mar. 21, 2007.

(Continued)

*Primary Examiner*—Amare Mengistu
*Assistant Examiner*—Hong Zhou
(74) *Attorney, Agent, or Firm*—Greenblum & Bernstein, P.L.C.

(57) ABSTRACT

A touch location detection section (103) detects the location on a display screen where the operator's finger touches. A transfer length calculation section (104) calculates the transfer length La of the operator's finger from the touch start location S to the touch end location E. A transfer length judgment section (105) judges whether or not the transfer length La is greater than a reference transfer length Ls. A location shift calculation section (106) calculates the location shift δ of the operator's finger. A location shift judgment section (107) judges whether or not the location shift δ is less than a predetermined reference location shift δs. When La>Ls and δ<δs, a screen split control section (108) controls the operation of an image display section so as to split a display screen 101.

12 Claims, 18 Drawing Sheets

U.S. PATENT DOCUMENTS

2006/0028453 A1* 2/2006 Kawabe .................. 345/173
2006/0033751 A1* 2/2006 Keely et al. ............. 345/619
2006/0066507 A1* 3/2006 Yanagisawa ............... 345/7
2008/0025529 A1* 1/2008 Keohane et al. .......... 381/104

FOREIGN PATENT DOCUMENTS

JP          8-051580         2/1996
JP          2007-241410      9/2007

OTHER PUBLICATIONS

U.S. Appl. No. 11/737,433 to Konno et al., filed Apr. 19, 2007.
U.S. Appl. No. 11/737,463 to Konno et al., filed Apr. 19, 2007.
U.S. Appl. No. 11/737,403 to Kuwabara et al., filed Apr. 19, 2007.

* cited by examiner

DISPLAY APPARATUS

CROSS-REFERENCE TO RELATED APPLICATIONS

This application claims the benefit of U.S. Provisional Application No. 60/877,007, filed Dec. 26, 2006, and claims the priority of Japanese Patent Application No. 2006-079779, filed Mar. 22, 2006, the disclosures of which are incorporated by reference in their entireties.

BACKGROUND OF THE INVENTION

1. Field of the Invention

The present invention relates to a display apparatus, and, more particularly, to a display apparatus that is optimal for a backseat passenger in a vehicle to view image provided with audio of a television, VTR (Video Tape Recorder), DVD (Digital Video Disc), car navigation system, etc.

2. Description of the Related Art

Conventionally provided display apparatuses of this type include a wide panel capable of displaying landscape-oriented images with an aspect ratio of 16:9, such as that of Hi-Vision broadcasting.

With such a display apparatus having a landscape display screen, when images with an aspect ratio of 4:3 such as in terrestrial television broadcasting are displayed without changing the aspect ratio wasteful blank regions that are usually black in color and without images appear on both sides of the display screen.

One known way to utilize such blank regions on a display screen is to make full use of the characteristics of the wide panel and split the display screen, and simultaneously display image from a plurality of sources (a main image and sub-image) on one display screen (Japanese Patent Application Laid-Open No. H8-51580, for example).

Nevertheless, with the above-mentioned conventional display apparatus, to split the display screen, the operator enters instructions for splitting the screen by operating screen split keys provided on a display apparatus dedicated remote controller, escutcheon switches provided on the display apparatus itself, or selection keys displayed on the touch panel of the display screen, for example.

As a result, such a conventional display apparatus requires much time to perform the screen split operation using a remote controller. In addition, in this case, the possibility of misplacing or losing the remote controller is high with a portable display apparatus or a vehicle-mounted display apparatus.

Further, with a display apparatus provided with escutcheon switches or a display apparatus that displays selection keys on the touch panel of the display screen, the display area for the images displayed on the display screen is limited by the layout space of the escutcheon switches or selection keys, making it no longer possible to display images on an impressive large screen.

Furthermore, with a display apparatus that displays selection keys on the touch panel of the display screen, although the main image and sub-image are shown in a full-screen display, the selection keys need to be displayed every time the operator wants to switch the display screen and the display screen switching operation takes time.

SUMMARY OF THE INVENTION

It is therefore an object of the present invention to provide a display apparatus capable of splitting the display screen by an extremely simple operation.

In accordance with one aspect of the present invention, a display apparatus employs a configuration having: an image display section that displays image on a display screen; a touch location detection section that detects a touch location of a finger of an operator on the display screen; a transfer length calculation section that calculates a transfer length from a touch start point to a touch end point of the finger of the operator that moves while touching the display screen, based on a detection result of the touch location detection section; a transfer length judgment section that judges whether or not the transfer length calculated by the transfer length calculation section is greater than a predetermined reference transfer length; a location shift calculation section that calculates a shift of the finger of the operator in location with respect to a straight track line from the touch start point to the touch end point, based on the detection result in the touch location detection section; a location shift judgment section that judges whether or not the location shift calculated by the location shift calculation section is less than a predetermined reference location shift; and a screen split control section that controls an operation of the image display section so that the display screen is split when the transfer length judgment section judges that the transfer length is greater than the reference transfer length and the location shift judgment section judges that the location shift is less than the reference location shift.

The present invention splits the display screen by an extremely simple operation by the operator of moving the finger touching the display screen a predetermine distance.

DETAILED DESCRIPTION OF THE PREFERRED EMBODIMENT

Figure 1:
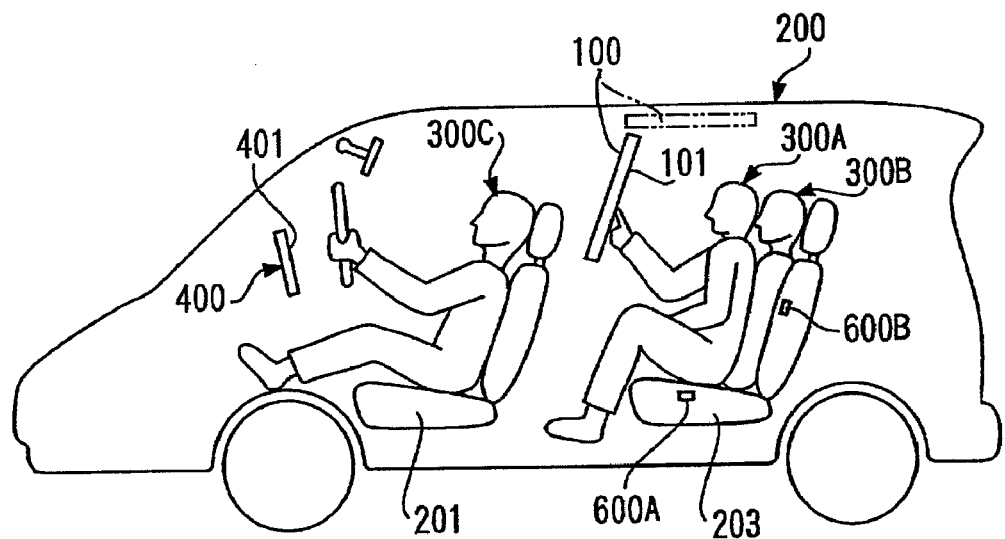
FIG. 1 is a general cross-sectional diagram showing the general structure of a suitable vehicle suitable for mounting a display apparatus according to an embodiment of the present invention.

Now the display apparatus according to an embodiment of the present invention will be described in detail with reference to the accompanying drawings. In each figure, components having the same configurations or functions will be assigned the same reference numerals and duplicate descriptions thereof will be omitted. Here, the present example will be described using a vehicle-mounted wide panel as an example.

Figure 2:
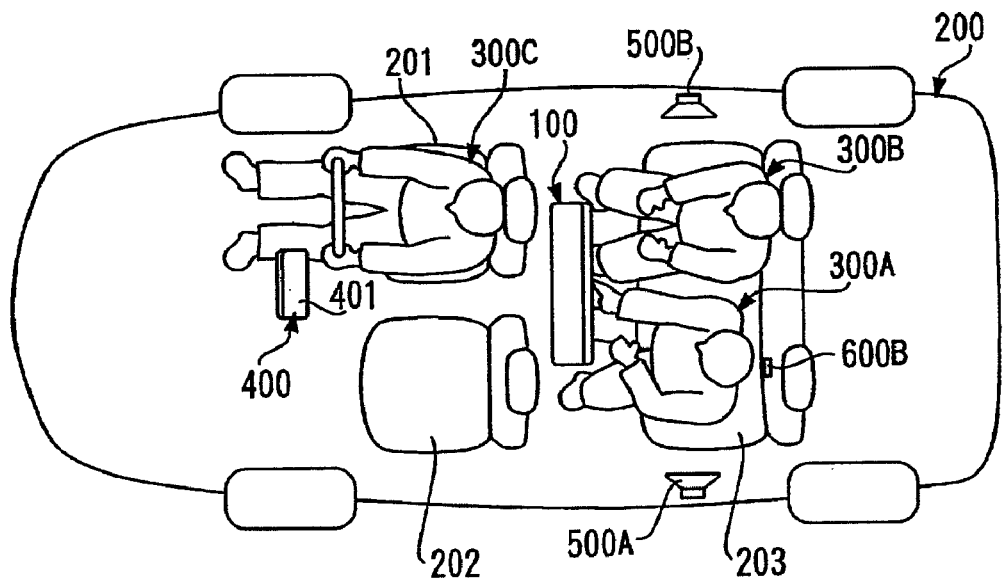
FIG. 2 is a general plain view showing the general structure of the vehicle shown in FIG. 1.

FIG. 1 is a general cross-sectional diagram showing the general structure of a vehicle suitable for mounting a display apparatus according to an embodiment of the present invention. FIG. 2 is a general plain view showing the general structure of the vehicle shown in FIG. 1.

As shown in FIG. 1 and FIG. 2, wide panel 100, which is the display apparatus of the present example, is installed on the ceiling section between the driver's seat 201, passenger's seat 202, and backseat 203 of vehicle 200.

Further, wide panel 100 of the present example is stored so that it becomes parallel with the ceiling section of the vehicle interior as shown by the dashed lines in FIG. 1 when not in use, and is lowered to the intermediate position in front of passengers 300A and 300B seated in backseat 203 as shown by the solid lines in FIG. 1 when in use.

Further, wide panel 100 of the present example is communicably connected to car navigation system 400 (hereinafter simply "navigation system") arranged on the console box (not shown) in front of driver's seat 201 so that the images displayed on display screen 101 of wide panel 100 can be transmitted and displayed on display screen 401 of navigation system 400.

As a result, for example, passenger 300A seated in backseat 203 can transmit and display the display information of images displayed on display screen 101 of wide panel 100, allowing passenger 300A to quickly inform driver 300C seated in driver's seat 201 of the information.

Further, as shown in FIG. 2, first speaker 500A and second speaker 500B are arranged on both sides of backseat 203 of vehicle 200.

First speaker 500A can output the audio of images displayed on display screen 101 of wide panel 100 viewed by passenger 300A seated in backseat 203.

Second speaker 500B can output the audio of images displayed on display screen 101 of wide panel 100 viewed by passenger 300B seated in backseat 203.

Further, first speaker 500A and second speaker 500B can also output the audio of images displayed on display screen 101 of wide panel 100 in stereo, with one speaker outputting the main audio and the other outputting the sub-audio.

Seat sensors 600A and 600B comprising weight sensors for detecting the seated locations of seated passengers 300A and 300B are arranged on the seat and seat back of backseat 203, respectively. Here, only seat sensors 600A and 600B corresponding to passenger 300A are shown, but seat sensors corresponding to passenger 300B are also provided.

Figure 3:
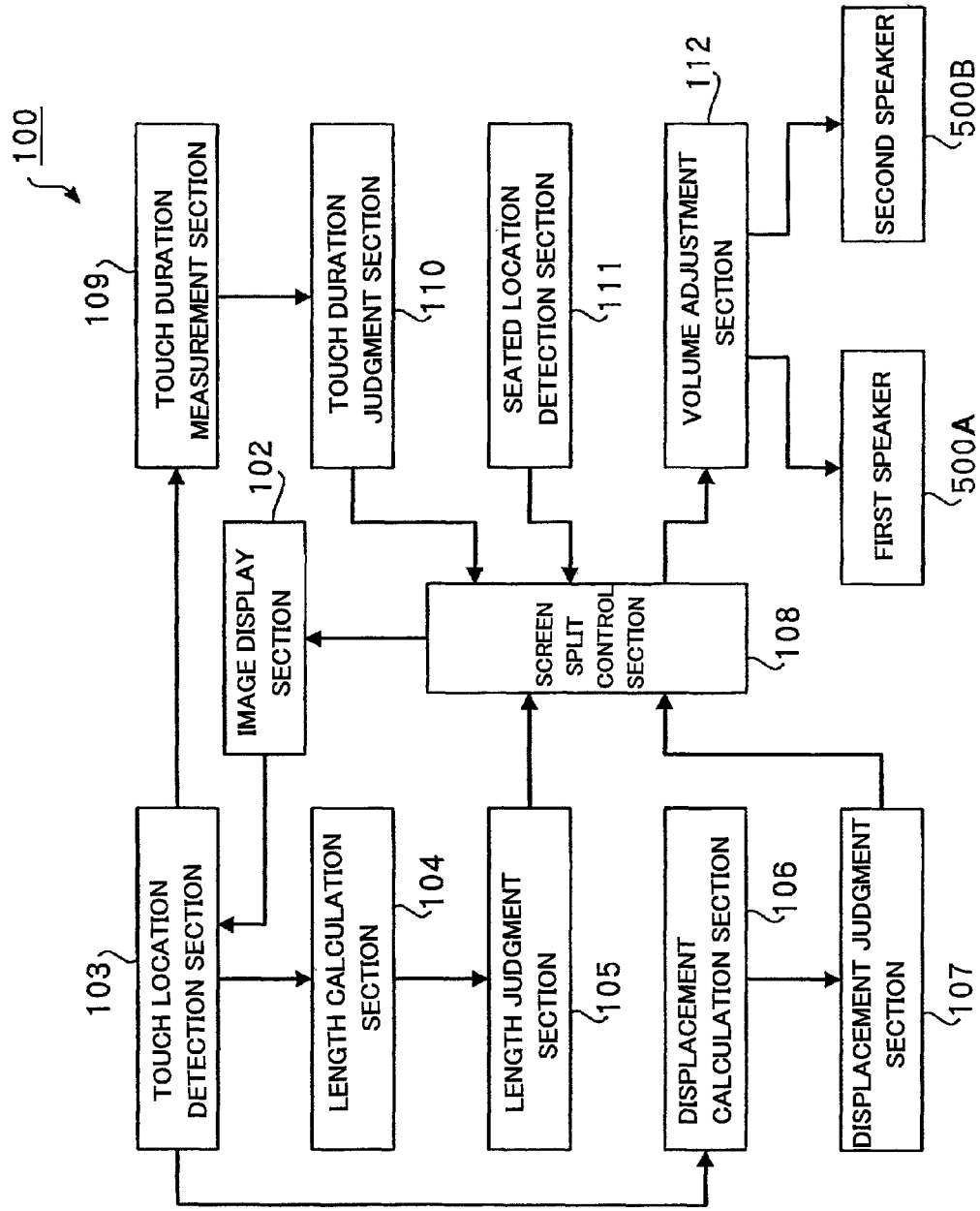
FIG. 3 is a block diagram showing the structure of a display apparatus according to an embodiment of the present invention.

Next, the configuration of wide panel 100 will be described. FIG. 3 is a block diagram showing the configuration of the display apparatus according to an embodiment of the present invention.

As shown in FIG. 3, wide panel 100, which is the display apparatus of the present example, comprises image display section 102, touch location detection section 103, transfer length calculation section 104, transfer length judgment section 105, location shift calculation section 106, location shift judgment section 107, screen split control section 108, touch duration measurement section 109, touch duration judgment section 110, seated location detection section 111, and volume adjustment section 112.

In FIG. 3, image display section 102 displays images of a television, VTR, DVD, car navigation system, etc. on display screen 101 comprising an LCD touch panel. Furthermore, each of the respective image sources is inputted from an external device (not shown).

Figure 4:
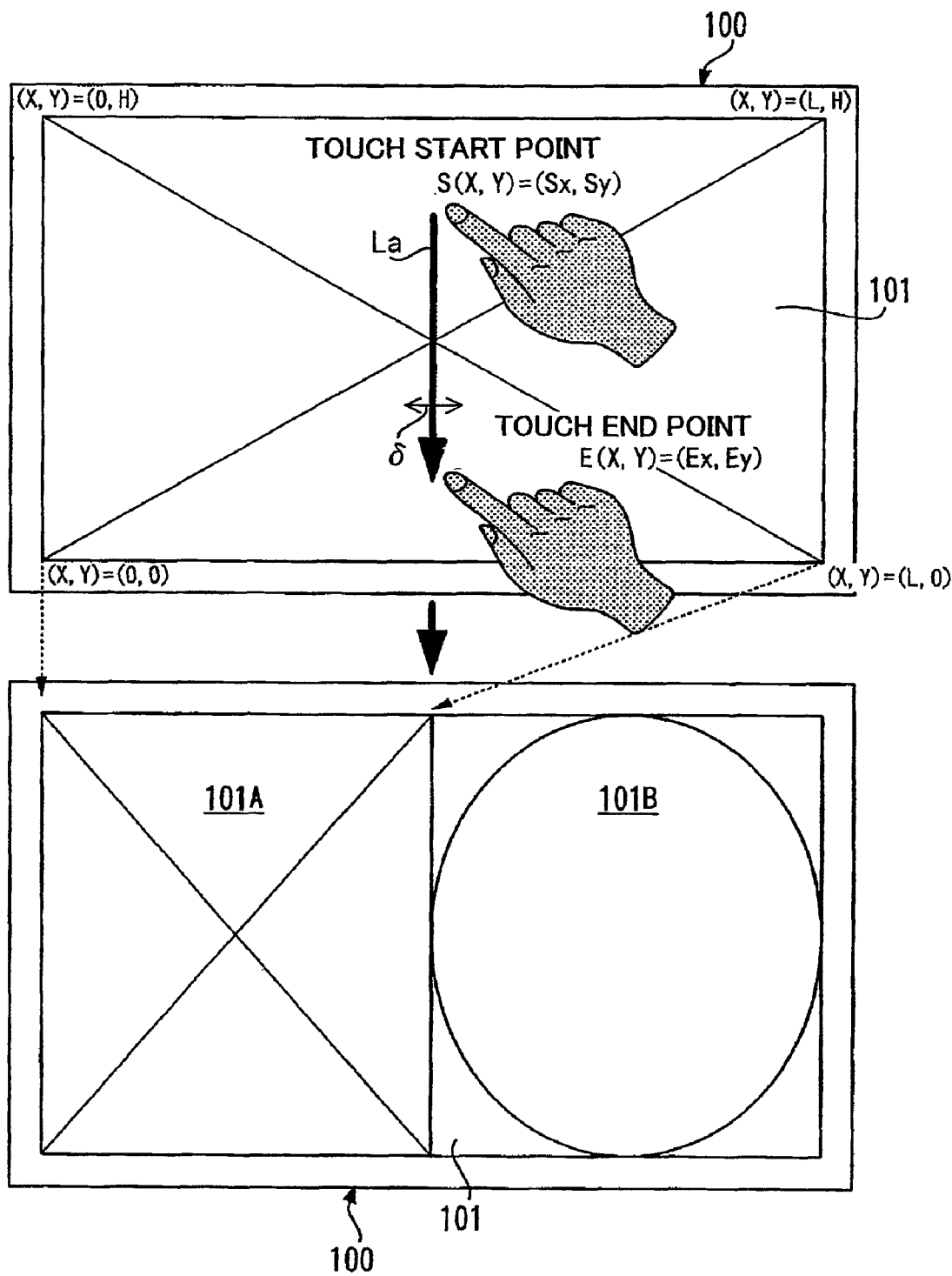
FIG. 4 is a schematic diagram for explaining the screen split operation performed by the operator to split the display screen of a display apparatus, into a left part and a right part according to an embodiment of the present invention.

Touch location detection section 103 detects the touch location of the finger of the operator (passenger 300A in the present example) on display screen 101 (see FIG. 4).

Transfer length calculation section 104, based on the detection result of touch location detection section 103, calculates the length of transfer from touch start point S to touch end point E of the operator's finger that moves while touching display screen 101.

Transfer length judgment section 105 judges whether or not the length of transfer of the operator's finger from touch start point S to touch end point E, which is calculated by transfer length calculation section 104, is greater than a preset reference transfer length.

Location shift calculation section 106, based on the detection result of touch location detection section 103, calculates the location shift of the operator's finger with respect to the straight track line of the operator's finger from touch start point S to touch end point E.

Location shift judgment section 107 judges whether or not the location shift of the operator's finger with respect to the straight track line of the operator's finger from touch start point S to touch end point E that is calculated by location shift calculation section 106 is less than a preset reference location shift.

Screen split control section 108 controls the operation of image display section 102 so that display screen 101 splits when length judgment section 105 judges that the length of transfer is more than the reference transfer length and location shift judgment section 107 judges that the location shift is less than the standard location shift.

Touch duration measurement section 109 measures the duration of touch of the operator's finger on display screen 101.

Touch duration judgment section 110 judges whether or not the duration of touch of the operator's finger on display screen 101 at touch start point S, which is measured by touch duration measurement section 109, is less than a preset reference touch duration.

Seated location detection section 111 detects the seated location of passenger 300A, the operator.

Seated location detection section 11 of wide panel 100 of the present example detects that passenger 300A is seated in backseat 203 on the left side in the traveling direction of vehicle 200 (behind the driver's seat) based on the presence or absence of output from seat sensors 600A and 600B, as shown in FIG. 1 and FIG. 2, for example.

Further, seated location detection section 111 of wide panel 100 of the present example detects if passenger 300A leans forward and is detached from the seat back of backseat 203, from the output of seat sensor 600B arranged on the seat back of backseat 203.

In this state, when touch location detection section 103 detects that the operator's finger touches display screen 101, the judgment is made that passenger 300A is operating display screen 101, as shown in FIG. 1 and FIG. 2.

Audio volume adjustment section 112 adjusts the audio volume outputted from the above-mentioned first speaker 500A and second speaker 500B.

Next, the screen split operation performed by the operator to split display screen 101 of wide panel 100 of the present example will be described. FIG. 4 is a schematic diagram for explaining the screen split operation performed by the operator to split the screen display of the display apparatus, into a left part and right part according to an embodiment of the present invention.

As shown in FIG. 4, to split display screen 101 of wide panel 100 of the present example, passenger 300A who is the operator traces the locations of the split the split on display screen 100 so as to draw a split borderline on the image displayed on display screen 101 of wide panel 100.

As a result of this operator operation, first, touch location detection section 103 detects the touch locations of the operator's finger on display screen 101, from touch start point S to touch end point E.

Next, transfer length calculation section 104, based on the detection result of touch location detection section 103, calculates the transfer length La from touch start point S to touch end point E, which is the transfer distance of the operator's finger on display screen 101.

Then, transfer length judgment section 105 compares a preset reference transfer length Ls with the transfer length La from touch start point S to touch end point E of the operator's finger, calculated by transfer length calculation section 104, and judges whether or not the relationship satisfies the condition La>Ls.

Here, because it is difficult for the operator to move his/her finger linearly on display screen 101, there is high likelihood that the tracks of the transfer will be somewhat zigzag.

Here, with wide panel 100 of the present example, location shift calculation section 106, based on the detection result of touch location detection section 103, calculates the location shift δ of the operator's finger with respect to the straight track line from touch start point S to touch end point E, which is the width of the zigzag motion of the operator's finger.

Next, location shift judgment section 107 compares the location shift δ of the operator's finger with respect to the straight track line of the operator's finger from the touch start point S to touch end point E calculated by location shift calculation section 106 with the preset reference location shift δs, and judges whether or not the relationship satisfies the condition δ<δs.

Then, screen split control section 108 controls the operation of image display section 102 so that display screen 101 is split when length judgment section 105 judges that the transfer length La is greater than the reference length Ls and location shift judgment section 107 judges that the location shift δ is less than the reference location shift δs.

As a result, as shown in the lower half of FIG. 4, display screen 101 of wide panel 100 is split into a left part and a right part, using the screen center as the split border.

With wide panel 100 of the present example, by the above-described screen split operation, the main image (indicated by the "×" symbol) displayed before the screen split is shown in first split screen 101A on the left side of display screen 101, and the sub-image (indicated by the "○" symbol) displayed after the screen split is shown in second split screen 101B on the right side of display screen 101.

Figure 5:
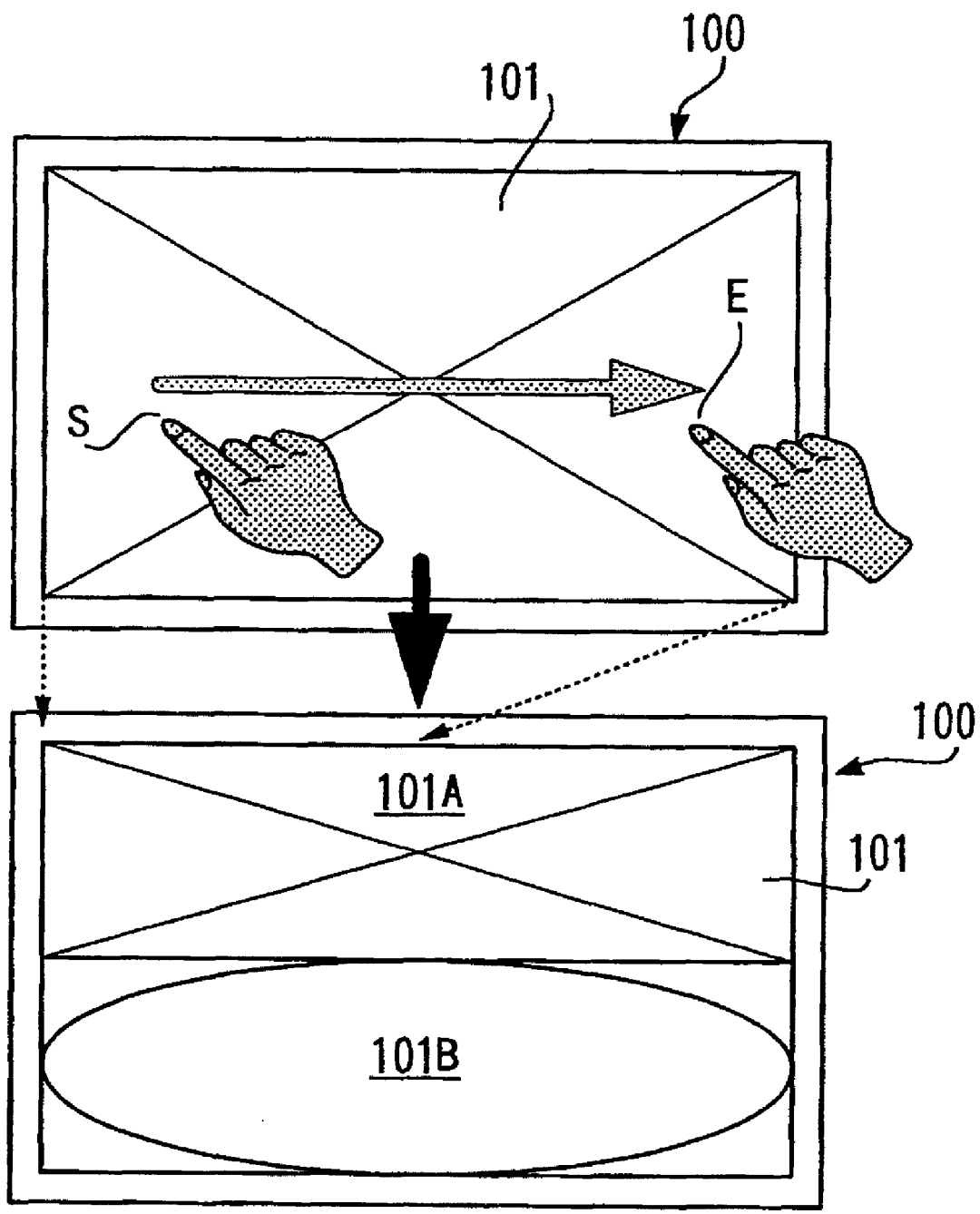
FIG. 5 is a schematic diagram for explaining the screen split operation performed by the operator to split the display screen of a display apparatus, into a top part and bottom part according to an embodiment of the present invention.

Furthermore, while FIG. 4 shows a case where the operator traces his/her finger in the longitudinal direction on display screen 101 and splits display screen 101 into a left part and a right part, the operator can also trace his/her finger in the transverse direction on display screen 101 and split the screen into an upper part and a lower part, as shown in FIG. 5.

Here, the default display location of first split screen 101A (main image) after the screen split of display screen 101 of wide panel 100 of the present example is in the left in FIG. 4 and is in the top in FIG. 5, but the default display locations for first split screen 101A (main image) and second split screen 101B (sub-image) may be reversed.

Further, wide panel 100 of the present example can be designed so that display screen 101 is split when the following AND conditions (1) to (5) are met:

(1) The transfer length (transfer distance) La of the operator's finger from touch start point S to touch end point E is greater than a certain distance (La>Ls). Here, reference length Ls can be set to a value of a certain percentage of height H of the vertical display direction of display screen 101 of wide panel 100, for example. Furthermore, either touch start point S or touch end point E may have the greater Y coordinate.

(2) Touch start point S is greater than or equal to half the height H in the vertical display direction of display screen 101, that is, in FIG. 4, touch start point S is greater than or equal to H/2, and touch end point E is less than or equal to half the height H in the vertical display direction (H/2).

(3) The location shift in the X direction from touch start point S to touch end point E is less than a specific value ($\delta < \delta s$). Here, the location shift in the X direction from touch start point S to touch end point E is obtained by having location shift calculation section 106 calculate the location shift $\delta$ of the operator's finger with respect to the straight track line of the operator's finger from touch start point S to touch end point E, based on the detection result of touch location detection section 103. Further, in regards to whether or not the location shift is less than the reference value, location shift judgment section 107 judges whether or not the location shift of the operator's finger with respect to the straight track line of the operator's finger from touch start point S to touch end point E, which is calculated by location shift calculation section 106, is less than a preset reference location shift $\delta s$.

(4) The time that passes from the finger press at touch start point S until the finger is detached at touch end point E, is within a specific range. Here, the passed time is obtained by having touch duration measurement section 109 measure the duration of touch of the operator's finger on display screen 101. Further, in regards to whether or not the passed time is within the specified period, touch duration judgment section 110 judges whether or not the duration of tough of the operator's finger on display screen 101 at touch start point S, which is measured by touch duration measurement section 109, is less than a preset reference touch duration.

(5) The calculated sum of the transfer length in the X direction from touch start point S to touch end point E does not exceed a predetermined specific value. By this means, it is possible to exclude cases where the tracks of the operator's finger (touch tracks) draw a curve between touch start point S and touch end point E, and clear determine whether the operator operation is the screen split operation or other operations besides the screen split operation.

Next, the accumulation method and processing method of the tracks of the operator's finger will be described.

The tracks of the operator's finger are accumulated in a ring buffer comprising about 100 elements so that the finger-pressed locations on the touch panel of display screen 101 can be acquired per unit time (about 0.1 second) and the finger-pressed locations on the touch panel over about 10 seconds can be accumulated.

Here, finger releases of short periods (about 0.2 seconds or less) are ignored, and when the touch panel continues being finger-pressed for a specific period of time (about 0.5 second) or longer and then remains unpressed for a specified period of time (about 0.3 second) or longer, touch start point S is set as the press start point on the touch panel, and touch end point E is set as the press end point where the touch panel was last pressed by the finger.

With wide panel 100 of the present example, it is possible to accumulate and process the tracks of the operator's finger as described above, thereby making it possible to judge screen transitions of display screen 101 including screen split, size change, transfer, and making display screen 101 a single screen.

Figure 6:
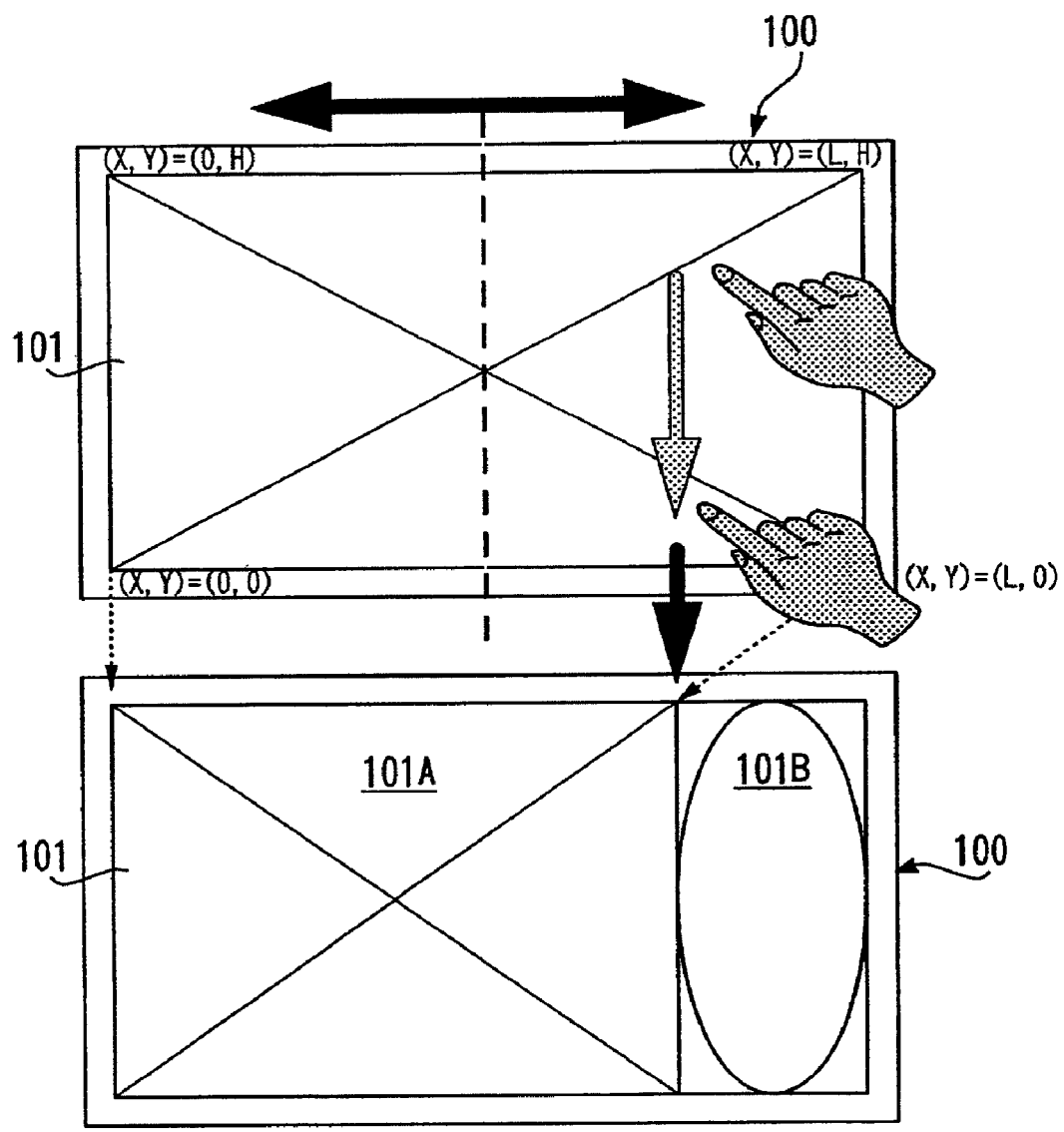
FIG. 6 is a schematic diagram for explaining the screen split operation performed by the operator to split the display screen of a display apparatus, into a left part and right part at a location in accordance with the tracks of the operator's finger according to an embodiment of the present invention.

For example, with wide panel 100 of the present example, when both X coordinates (or the average of the two points) of touch start point S and touch end point E are within a predetermined range in the horizontal direction from the display center of display screen 110, display screen can be split drawing a split borderline between the X coordinates, as shown in FIG. 6.

Thus, with wide panel 100 of the present example, display screen 101 can be split into a left part and a right part at locations in accordance with the tracks of the operator's finger, thereby eliminating the need for the operator to set the location of the split borderline during the screen split operation and simplifying the screen split operation by the operator.

Figure 7:
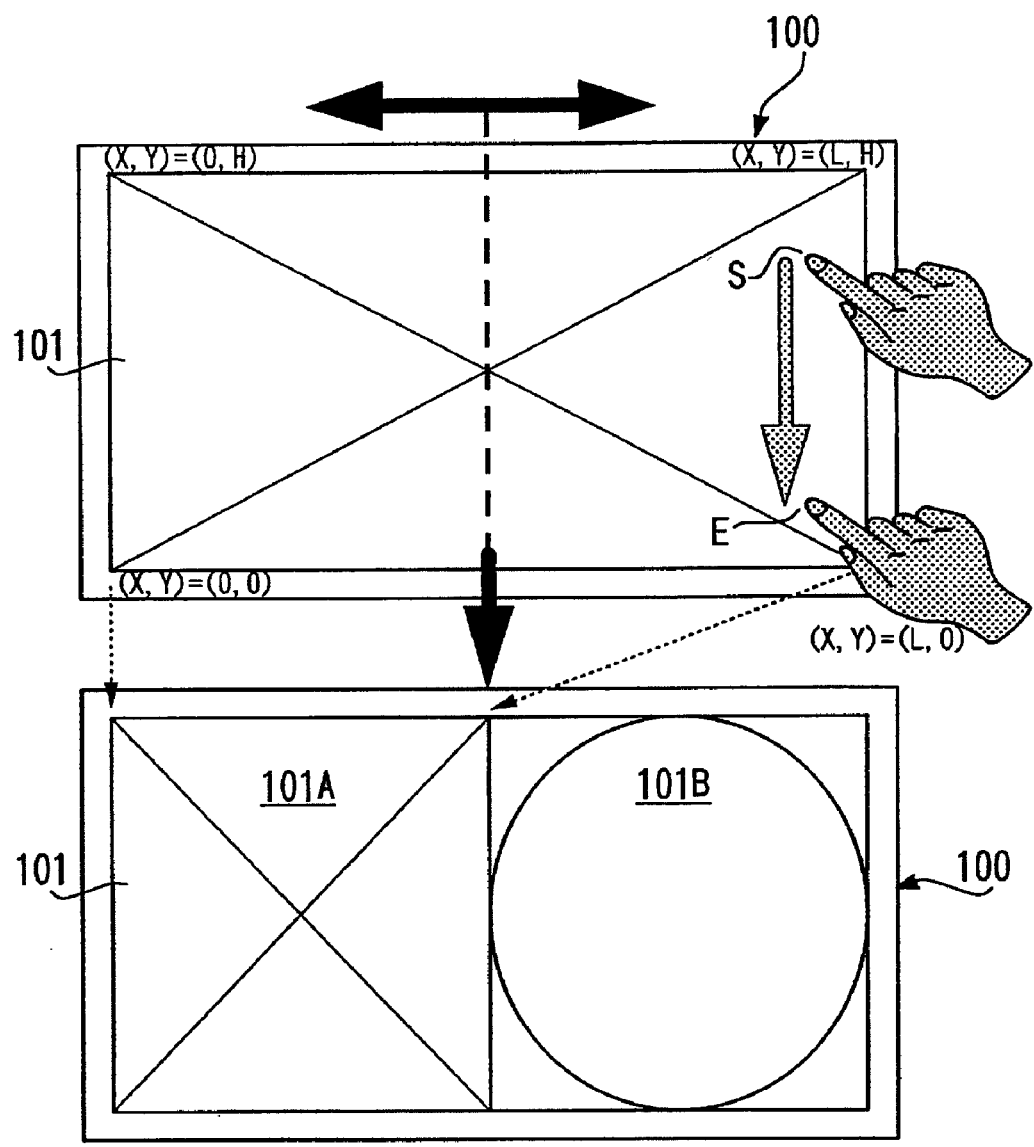
FIG. 7 is a schematic diagram for explaining the screen split operation performed by the operator to split the display screen of a display apparatus into a left part and right part at the center location of the display screen in accordance with the locations on the tracks of the operator's finger according to an embodiment of the present invention.

Further, with wide panel 100 of the present example, when both X coordinates (or the average of the two points) of touch start point S and touch endpoint E are not within a predetermined range in the horizontal direction from the display center of display screen 101, display screen 101 can be split so that the split borderline after the screen split operation crosses the display center of display screen 101, as shown in FIG. 7.

In this case, within the predetermined range in the horizontal direction from the display center of display screen 101, the vertical line that is the closest to touch start point S or touch end point E may be used as the split border.

Figure 8:
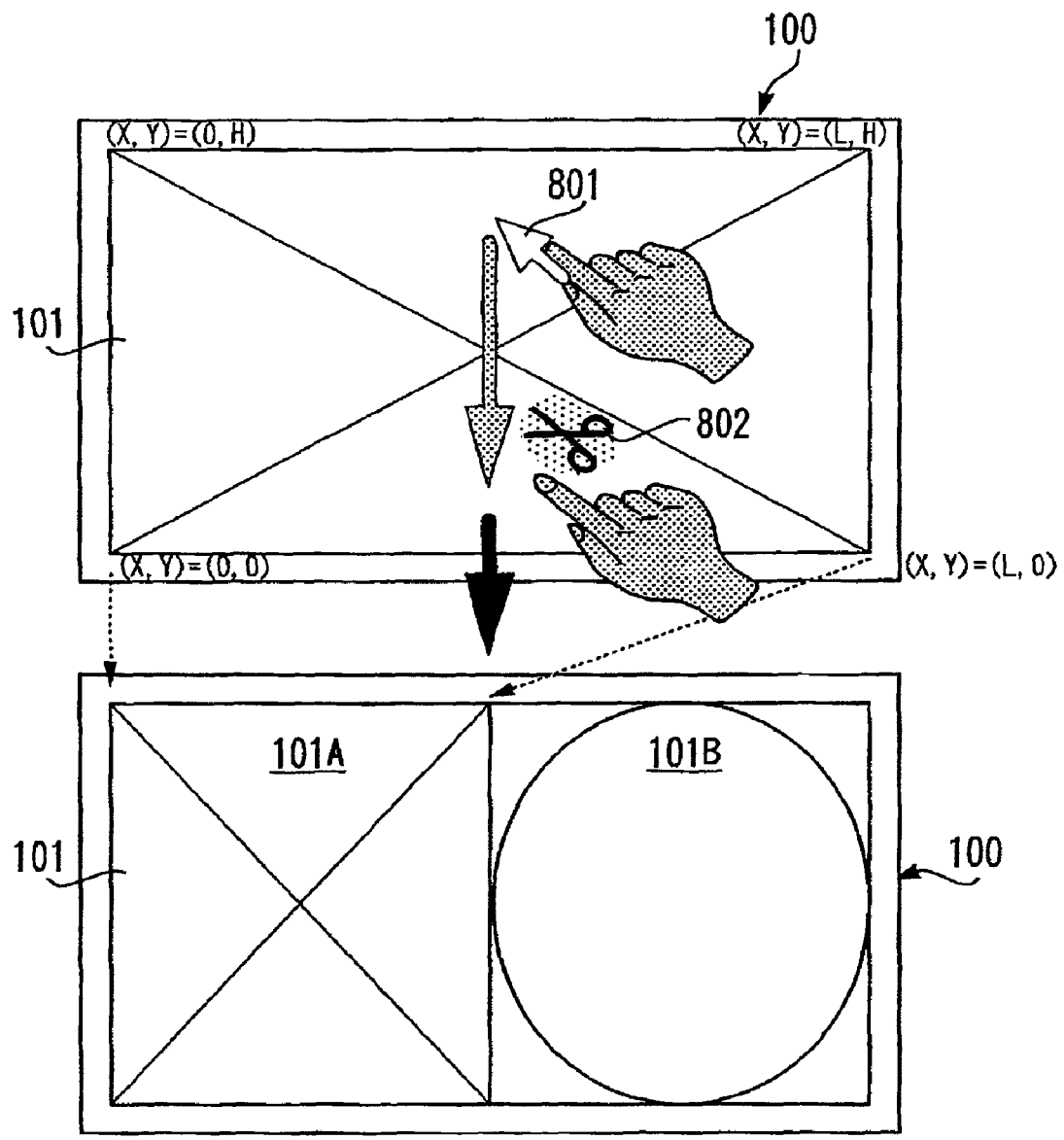
FIG. 8 is a schematic diagram for explaining the operation performed by the operator to change the type of cursor shown on the display screen of a display apparatus in accordance with conditions acquired from the path of the operator's finger according to an embodiment of the present invention.

Further, with wide panel 100 of the present example, when the above-mentioned screen split conditions are met during a dragging operation on the touch panel of display screen 101, as shown in FIG. 8, cursor 801, which by default is represented by an arrow, changes to, for example, cursor 802 (etc.) of a picture that visually suggests to the operator the screen split operation (here, the illustration of scissors).

In this manner, wide panel 100 of the present example can change the type of cursor shown on display screen 101 in accordance with the conditions acquired from the tracks of the operator's finger, enabling visual distinction as to whether the operator operation is a screen split operation or an operation other than the screen split operation.

Further, with wide panel 101 of the present example, when display screen 101 is split, the display locations of first split screen 101A (main image) and second split screen 101B (sub-image) can be changed according to the positional relationship between touch start point S and touch end point E.

For example, when touch end point E is on the right side of display screen 101 with respect to touch start point S, wide panel 100 of the present example displays first display screen 101A that displays the main image on the right side.

Further, when touch end point E is on the left side of display screen 101 with respect to touch start point S, wide panel 100 of the present example displays first display screen 101A that displays the main image on the left side.

Thus, with wide panel 100 of the present example, the operator is able to select preferred display locations of first display screen 101A that displays the main image, and display screen 101A at ease upon the screen split operation.

Figure 9:
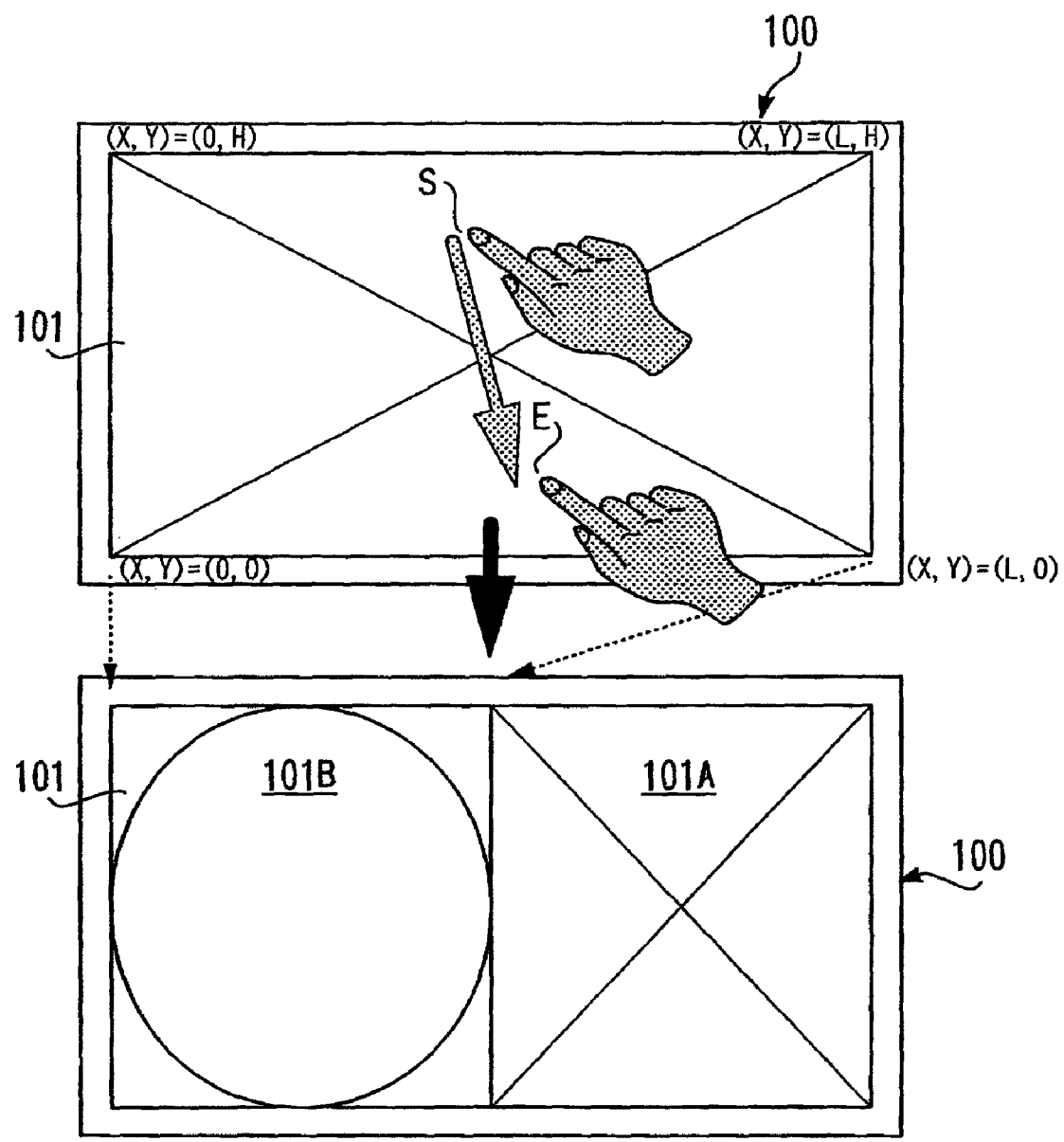
FIG. 9 is a schematic diagram for explaining the screen split operation performed by the operator to select the display locations of the split screens after the display screen of a display apparatus is split based on the touch end point of the operator's finger, according to an embodiment of the present invention.
Figure 10:
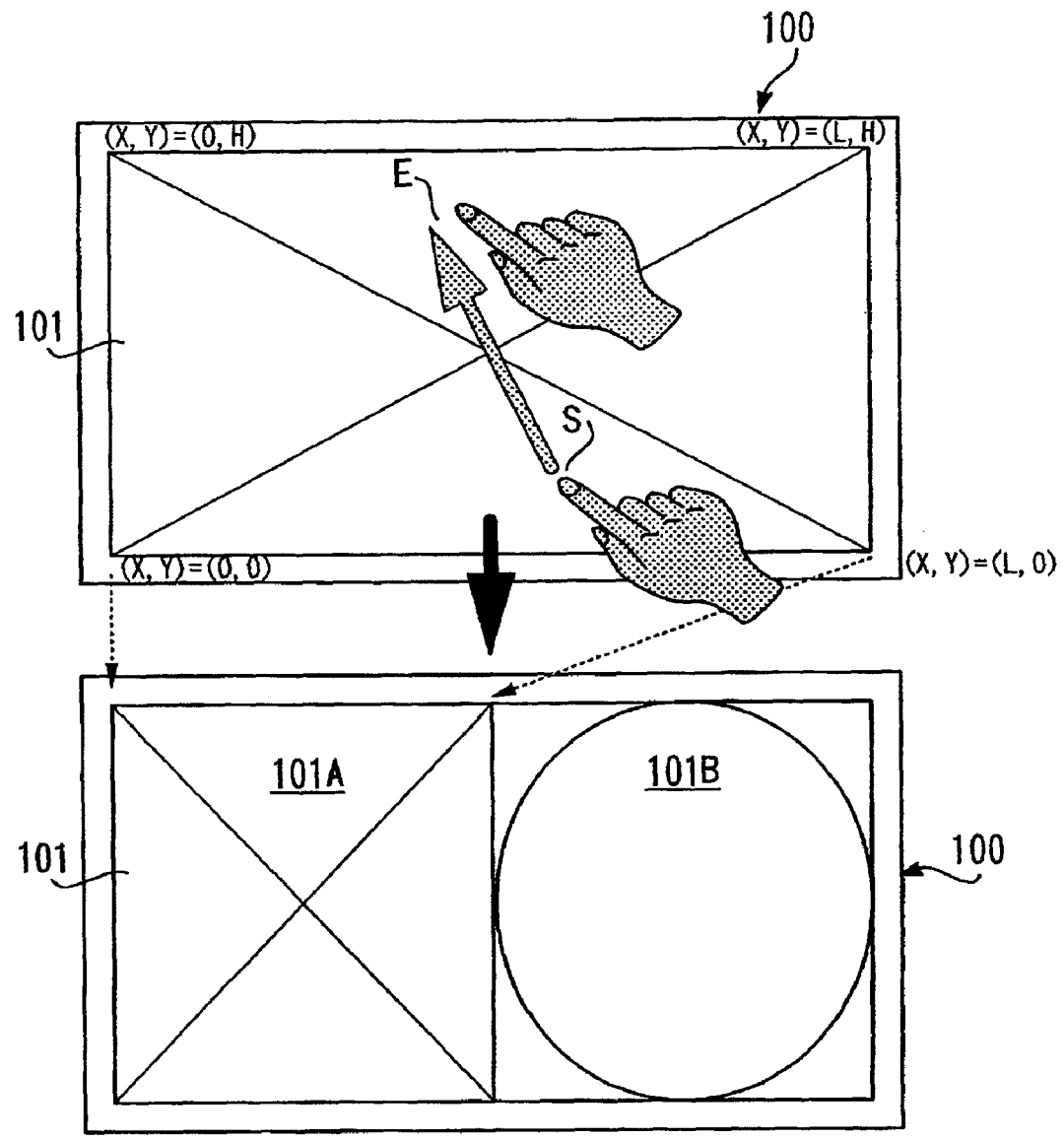
FIG. 10 is a schematic diagram for explaining another screen split operation performed by the operator to select the display locations of the split screens after the display screen of a display apparatus is split based on the touch end point of the operator's finger, according to an embodiment of the present invention.

Furthermore, although a case has been described with FIG. 9 where start end point E of the operator's finger is located in a lower part of display screen 101, with wide panel 100 of the present example, as shown in FIG. 10, it is equally possible to select preferred display locations of first display screen 101A that displays the main image, and display screen 101A at ease, even when the touch end point E of the operator's finger is located in an upper part of display screen 101.

Further, with wide panel 100 of the present invention the display locations of first display screen 101A and second display screen 101B after the screen split can be changed depending on whether the operator operating the touch panel of display screen 101 is seated on the left or right seat location of backseat 203 of vehicle 200.

Figure 11:
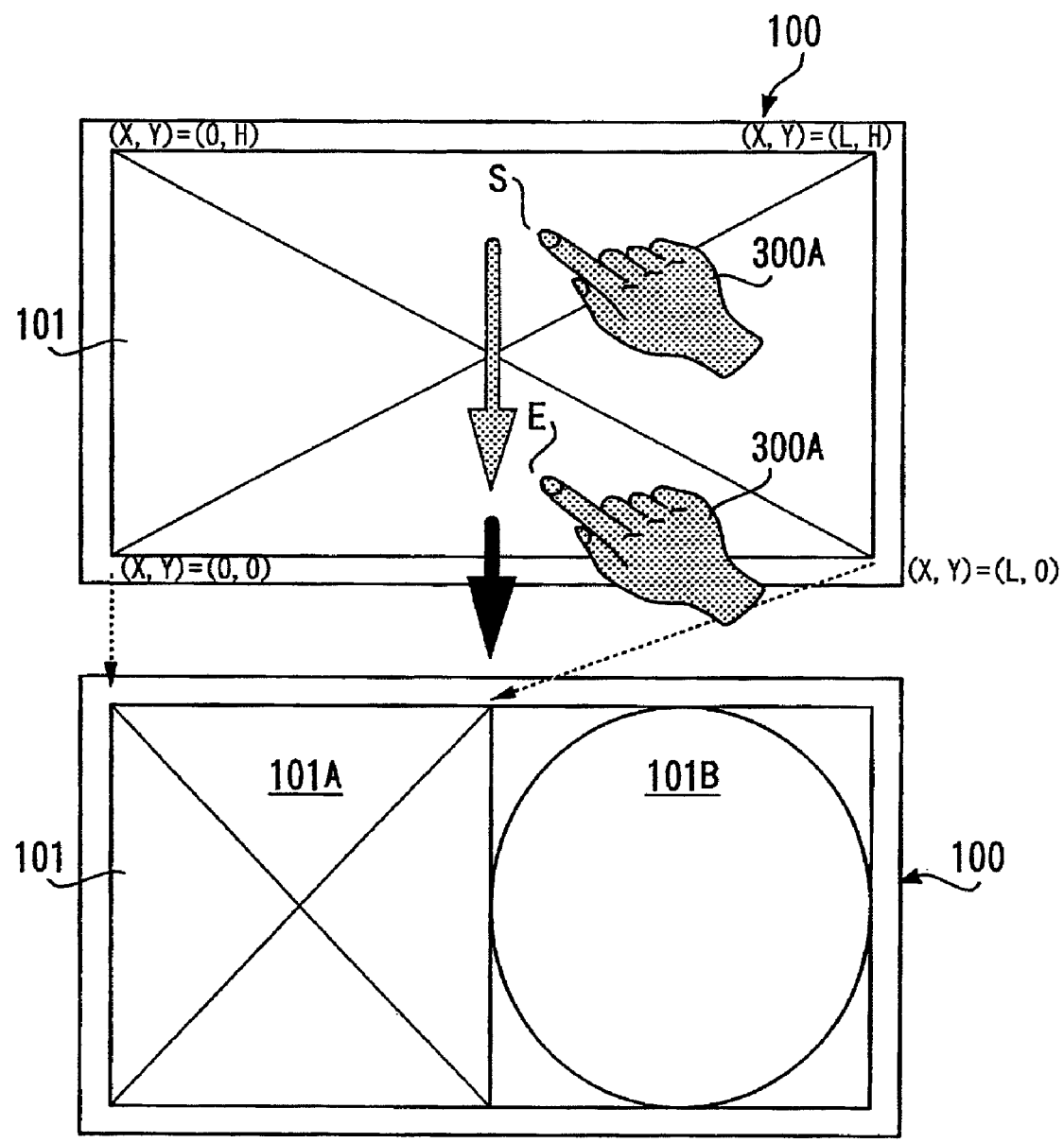
FIG. 11 is a schematic diagram for explaining the screen split operation performed by the operator to change the display locations of the split screens after the display screen of a display apparatus is split in accordance with the seated location of the operator, according to an embodiment of the present invention.

For example, as shown in FIG. 1 and FIG. 2, when the operator (passenger 300A) is seated in the seat location located on the left side with respect to the travel direction in backseat 203 of vehicle 200, by finger operation by passenger 300A, the main image, which is the default image of first display screen 101A after the screen split, is split and displayed on the left side of display screen 101 which is closer to where passenger 300A is seated, as shown in FIG. 11.

Thus, with wide panel 100 of the present example the main image, which is the default image, is displayed on the closer side to the seated location of the operator even when display screen 101 is split by the screen split operation, thereby allowing the operator to continue viewing the main image he or she was viewing prior to the screen split without feeling much disrupted.

Furthermore, as shown in FIG. 1 and FIG. 2, when both passenger 300A and passenger 300B are viewing the same main image and at a certain point passenger 300A decides to view a different sub-image and performs the screen split operation for display screen 101, the sub-image is preferably displayed on the side where operator 300A is seated.

Thus, with wide panel 100 of the present example, even when display screen 101 is split by the screen split operation by passenger 300A, the main image, which is the default image, is displayed on the closer side to the seated location of passenger 300B, thereby allowing passenger 300B to continue viewing the main image he or she was viewing prior to the screen split without feeling disturbed.

Here, whether the operator operating the touch panel of display screen 101 is seated in the left or right seat location of backseat 203 of vehicle 200 is judged by seated location detection section 111.

Seated location detection section 111 of wide panel 100 of the present example judges the seated location of the operator by the presence or absence of output of seat sensors (weight sensors) 600A and 600B arranged on the seat and seat back of backseat 203.

That is, when there is output from only one of seat sensors 600A and 600B arranged in predetermined seat locations of backseat 203, seated location detection section 111 judges that the passenger seated there is the operator.

Further, when there is output from all of seat sensors 600A and 600B arranged in predetermined seat locations of backseat 203 (that is, the seats are full), seated location detection section 111 judges that the passenger seated in the seat location with smaller output from seat sensors (weight sensors) 600A and 600B is the operator, because that the passenger, who is the operator, is likely to slightly raise his or her hip from the seat of backseat 203 or detach from the seat back when touching the touch panel of display screen 101.

Furthermore, the sub-image displayed on second split screen 101B after the screen split is, for example, the image (navigation image, etc.) displayed on display screen 401 of navigation system 400 arranged on the consol box (not shown) in front of driver's seat 201, or the image source (television image, etc.) previously displayed prior to the screen split of display screen 101 of wide panel 100.

Here, with wide panel 100 of the present example, the navigation image displayed on display screen 401 of navigation system 400 of driver's seat 201 is preferably used as the sub-image to display on second split screen 101B of display screen 101 after the screen split.

Thus, with wide panel 100 of the present example, the navigation image displayed on display screen 401 of navigation system 400 and the navigation image employed as the sub-image displayed on second split screen 101B of display screen 101 of wide panel 100 after the screen split, can be synchronized.

Inconsequence, with wide panel 100 of the present example, passengers 300A and 300B in backseat 203 are able to operate the navigation image displayed on display screen 401 of navigation system 400 by operating the navigation image as a sub-image displayed on display screen 101.

By this means, with wide panel 100 of the present example, passengers 300A and 300B in backseat 203, who are relatively available, are able to, for example, search for the destinations, places for fueling or rest areas for driver 300C and transfer to and display search results on display screen 401 of navigation system 400, thereby providing valuable information for driver 300C.

Figure 12:
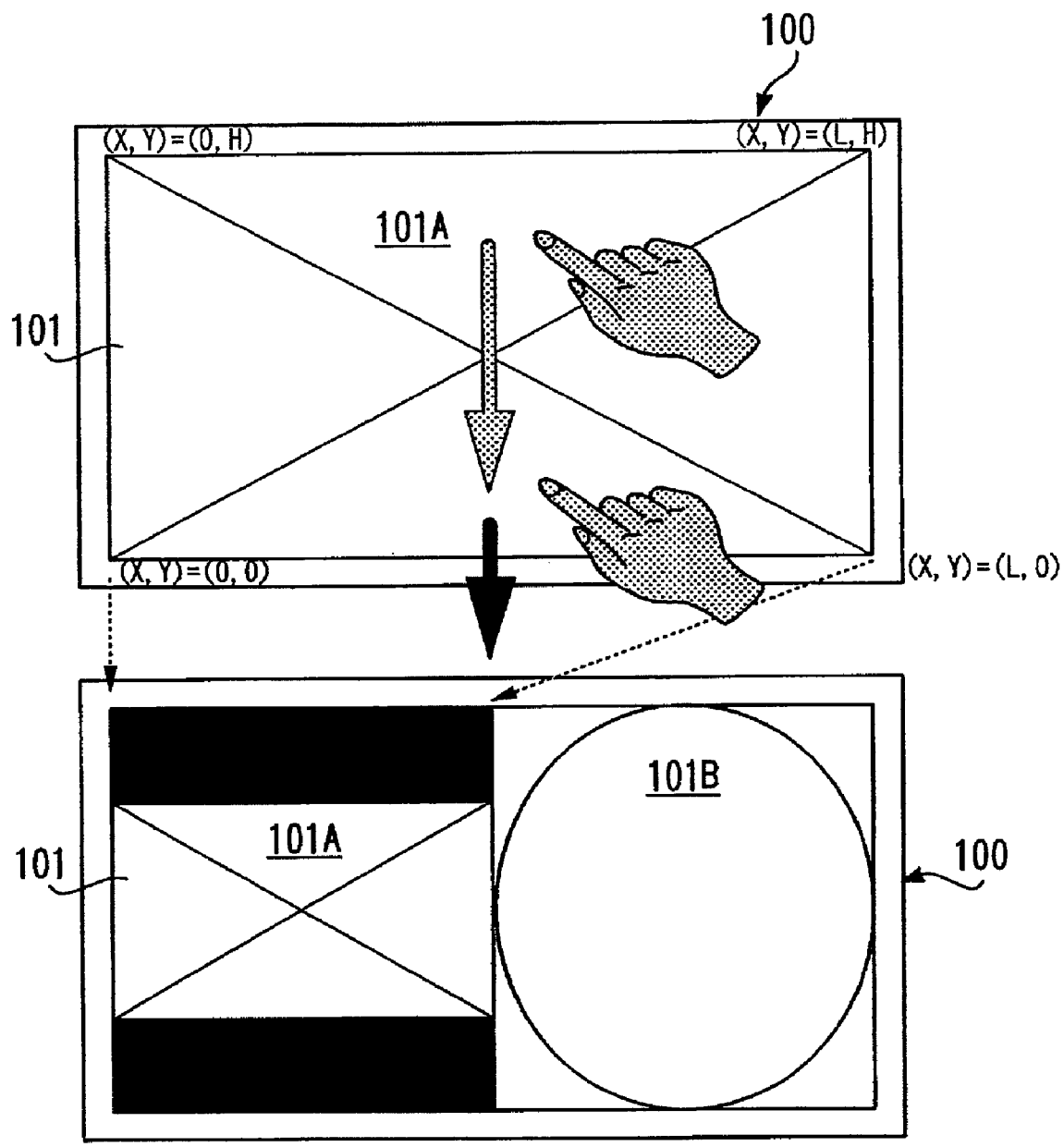
FIG. 12 is a schematic diagram for explaining the aspect ratio of the sub-image after the screen split when the display screen of a display apparatus is split, according to an embodiment of the present invention.

Here, the aspect ratio of the main image displayed prior to the screen split of display screen 101 may be maintained even when the main image is displayed on first split screen 101A after the screen split, as shown in FIG. 12.

Thus, the main image displayed on first split screen 101A after the screen split of display screen 101 does not become a partial image as a result of the screen split, allowing the viewer to continue viewing without feeling disturbed.

Figure 13:
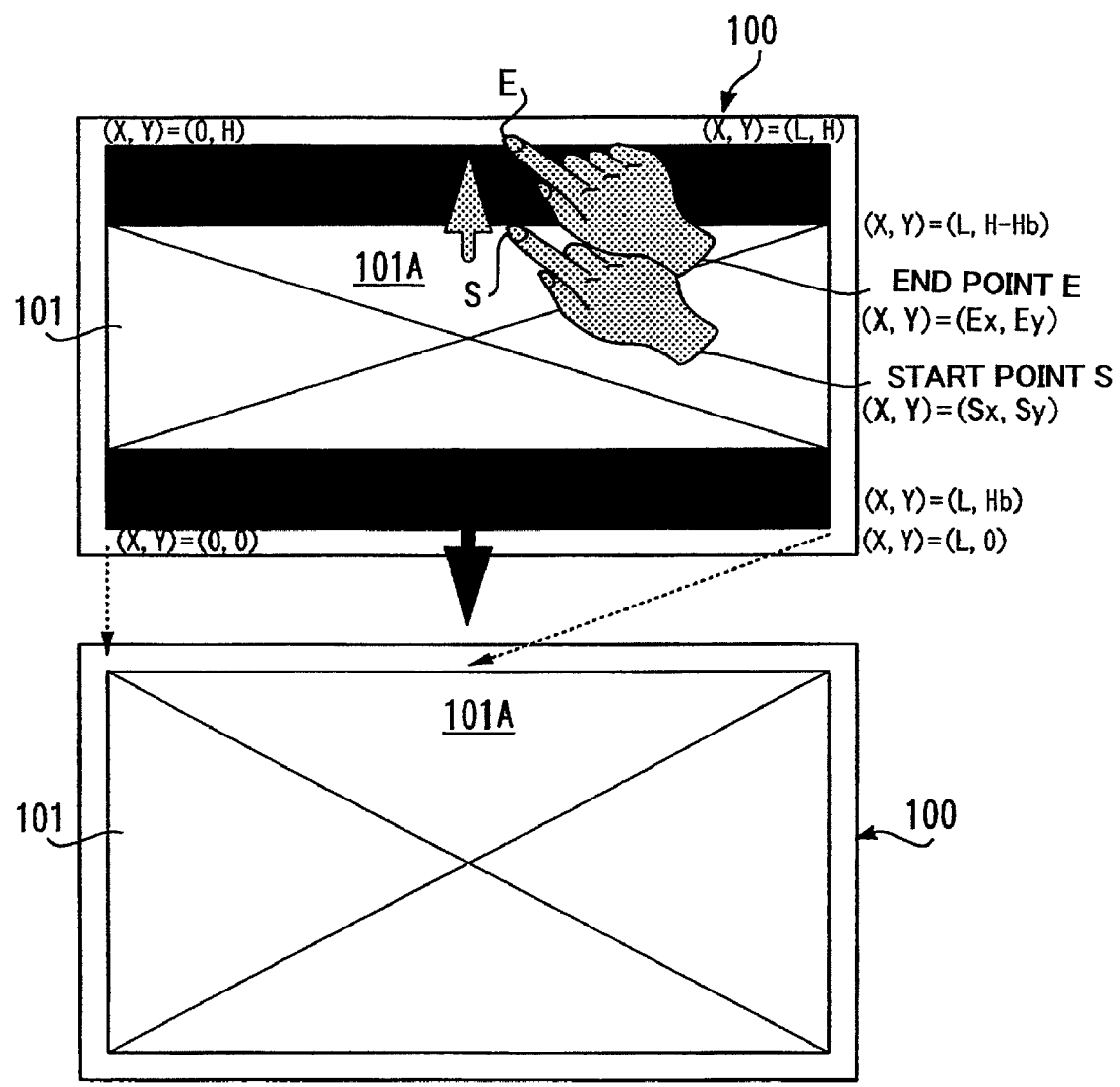
FIG. 13 is a schematic diagram for explaining the operation performed by the operator to expand the letter box image displayed on the display screen of a display apparatus, according to an embodiment of the present invention.

Further, with wide panel 100 of the present example, as shown in FIG. 13, the operator is able to expand the letter box image by dragging and moving with his or her finger the edges of the letter box image displayed on display screen 101 in the longitudinal direction.

Here, possible ways of judging that the image displayed on display screen 101 is a letter box image include, for example, recognition from the picture signal or the aspect ratio identification signal (specified in terminal S and terminal D) of the picture signal line.

Furthermore, if the average luminance of the horizontal line of images displayed on display screen 101 is less than or equal to a specific value, the color is recognized as black and, if a certain number of black lines continue in time, the area can be judged a letter box.

Further, when the AND conditions indicated in the following (1) to (5) are met, with wide panel 100 of the present example, it is possible to judge that the operator dragged the edges of the image displayed on display screen 101 with his or her finger.

(1) The height of touch start point S (SY) with respect to the height of the border of the letter box (Hb or H-Hb), is within a specific ± range.

(2) The height of touch end point E (EY) with respect to the screen height (H), is within a specific ± range.

(3) The location shift in the X direction from touch start point S to touch endpoint E, is less than or equal to a specific value.

(4) The time that passes from the finger press at touch start point S until the finger is detached at touch end point E, is within a specific range.

(5) The calculated sum of the transfer length in the X direction from touch start point S to touch end point E does not exceed a predetermined specific value (thereby making it possible to exclude cases where the operator's finger draws a curve between touch start point S and touch end point E.)

Figure 14:
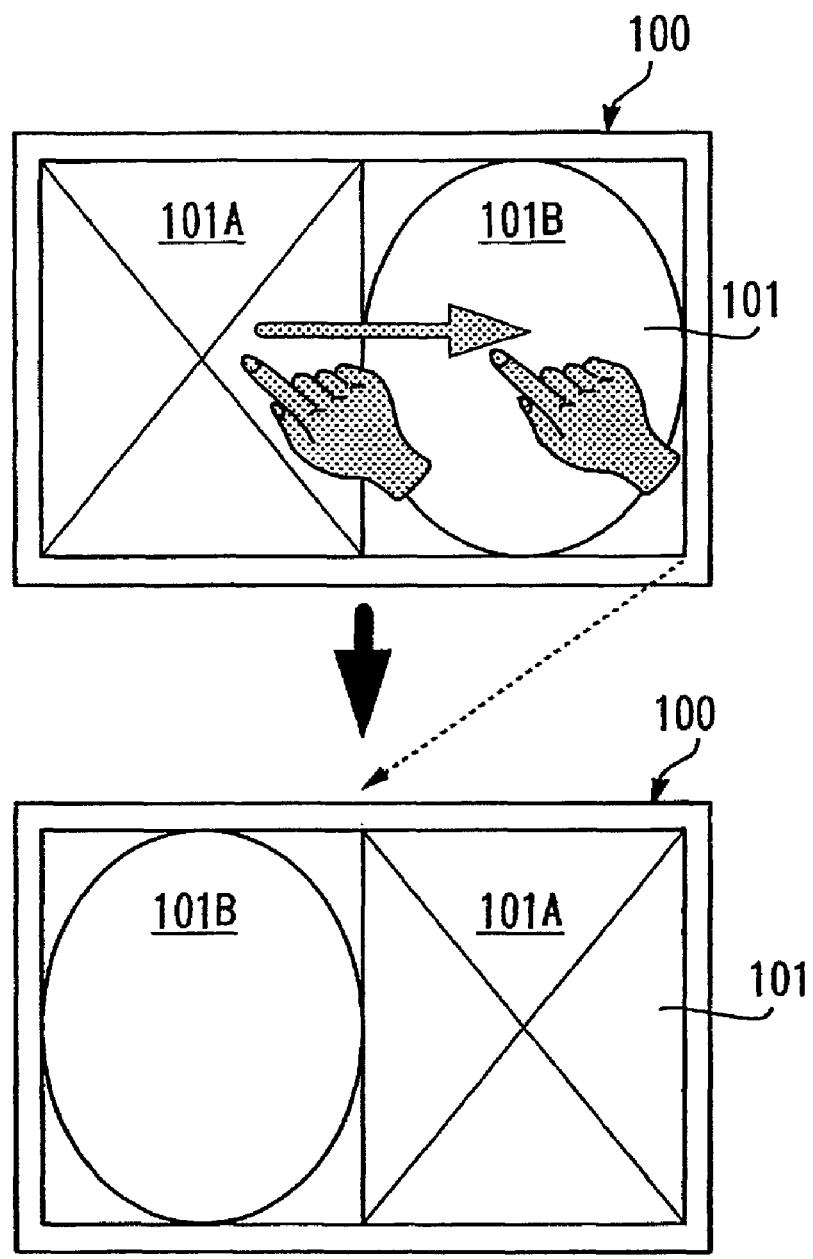
FIG. 14 is a schematic diagram explaining the operation performed by the operator to switch the display locations of the main image and sub-image displayed on the display screen of a display apparatus, according to an embodiment of the present invention.

Further, as shown in FIG. 14, with wide panel 100 of the present example, the operator is able to switch the display locations of the main image and sub-image left and right by dragging the image displayed on display screen 101 with his or her finger.

Here, when the AND conditions indicated in the following (1) to (5) are met, wide panel 100 of the present example can judge that the operator dragged the image displayed on display screen 101 with his or her finger.

(1) Touch start point S is located near the center of one of the two split screens and touch end point E is located near the center of the other split screen.

(2) The location shift in the Y direction from touch start point S to touch end point E is less than or equal to a specified value.

(3) After a press at touch start point S begins and after the finger is motionless for a short period of time with an "image-grabbing" image, the finger starts the transfer operation. For example, after a press starts at touch start point S, over a predetermined period of time (about 0.1 second), the press is within a specific range (a number of pixels) from touch start point S. This is used to distinguish between the "screen split" operation and the "screen switch" operation. Furthermore, the when all of the conditions are met, the cursor may change from an "arrow" to a "grabbing hand."

(4) The time that passes from the finger press at touch start point S until the finger is detached at touch end point E, is within a specific range.

(5) The calculated sum of the transfer length in the Y direction from touch start point S to touch end point E does not exceed a predetermined specific value (thereby making it possible to exclude cases where the operator's finger draws a curve between touch start point S and touch end point E.)

Further, when display screen 101 is split, with wide panel 100 of the present example, the audio volume outputs from left and right first speaker 500A and second speaker 500B can be changed in accordance with the screen split.

Figure 15:
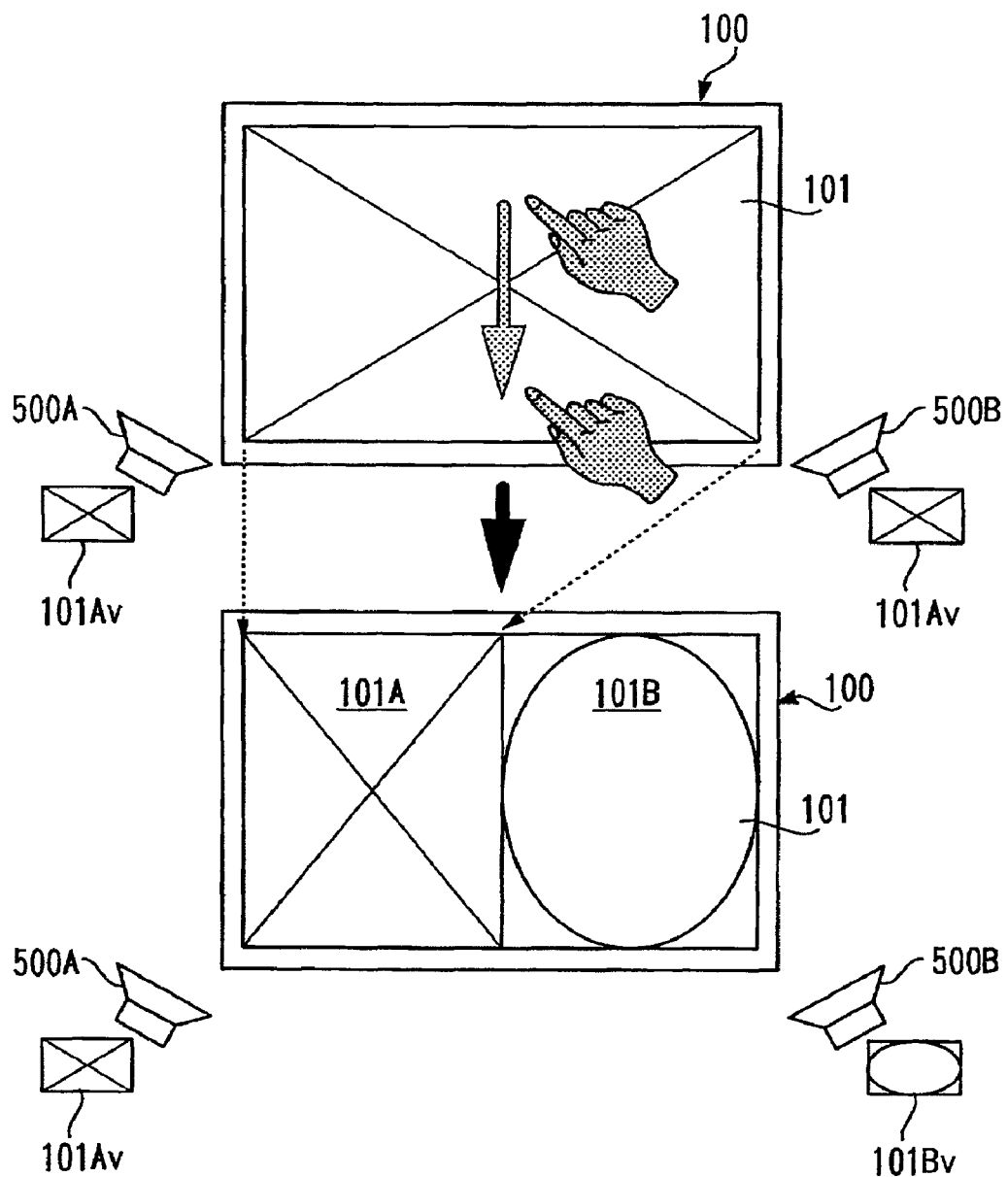
FIG. 15 is a schematic diagram explaining the operation for associating the left and right speaker outputs with the display locations of the main image and sub-image displayed on the display screen of a display apparatus, according to an embodiment of the present invention.

For example, with wide panel 100 of the present example, as shown in FIG. 15, by splitting display screen 101, it is possible to output audio 101Av of the main image of the left side of display screen 101 from first speaker 500A on the left side and output audio 101Bv of the sub-image of the right side of display screen 101 from second speaker 500B on the right side.

Here, audio volume adjustment section 112 adjusts the audio volume so that the display locations of the main image and sub-image displayed on display screen 101 and the audio of left and right speakers 500A and 500B are associated.

Figure 16:
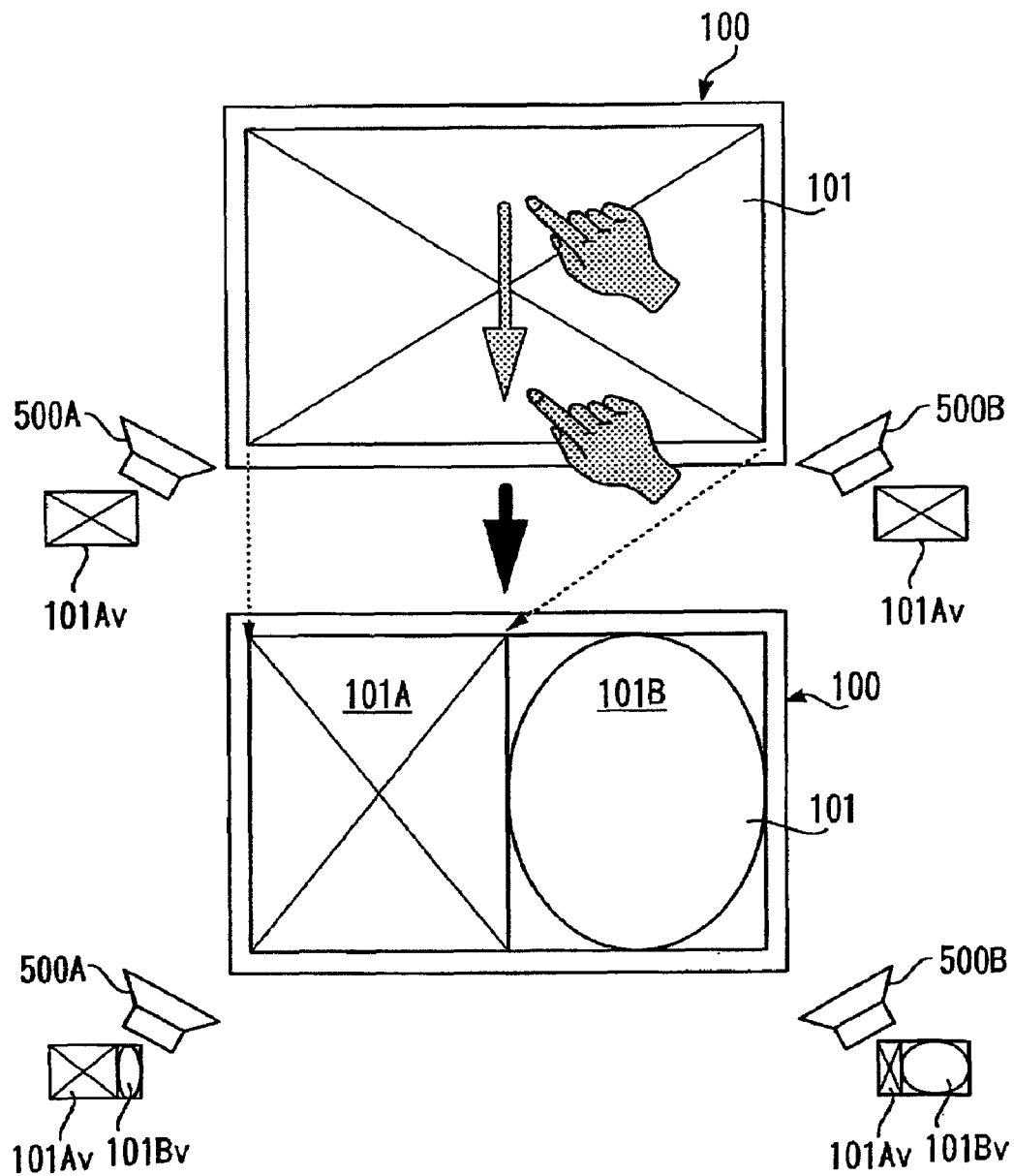
FIG. 16 is a schematic diagram for explaining the operation for adjusting the audio volumes of the main image and sub-image outputted from the left and right speakers in accordance with the screen sizes after the screen split of the display screen of a display apparatus, according to an embodiment of the present invention.

Further, with wide panel 100 of the present example, when display screen 101 is split, it is possible to increase the audio volume 101Av of the main image on the left side and decrease the audio volume 101Bv of the sub-image from speaker 500A on the left side, and increase the audio volume 101Bv of the sub-image on the right side and decrease the audio volume 101Av of the main image from speaker 500B on the right side, as shown in FIG. 16.

Furthermore, with wide panel 100 of the present example, it is possible to adjust the audio volume in accordance with the images on the split screens in cases when two or more speakers are provided.

Figure 17:
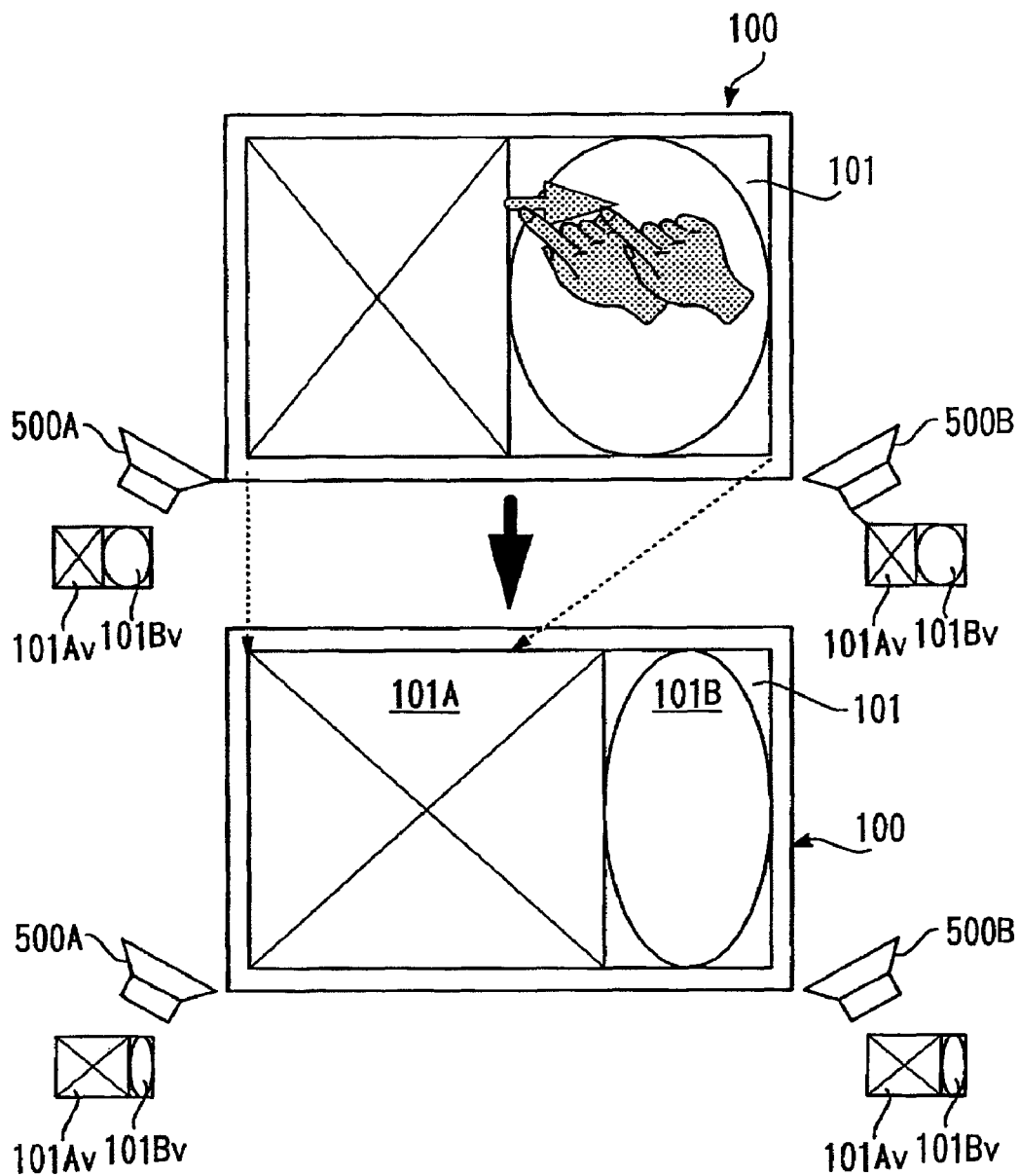
FIG. 17 is a schematic diagram for explaining the operation for associating the ratio of audio outputted from the left and right speakers with the main image and sub-image displayed on the display screen of a display apparatus, according to an embodiment of the present invention.

Further, as shown in FIG. 17, with wide panel 100 of the present example, when the screen size ratio of first split screen 101A and second split screen 101B after a screen split is changed, it is possible to adjust the audio volume 101Av of the main image and the audio volume 101Bv of the sub-image outputted from left and right speakers 500A and 500B in synchronization with the screen sizes of first split screen 101A and second split screen 101B.

As a result, as shown in FIG. 17, with wide panel 100 of the present example, when first split screen 101A on the left side is larger than second split screen 101B on the right side, it is possible to increase the audio volume 101Av of first split screen 101A on the left side.

Figure 18:
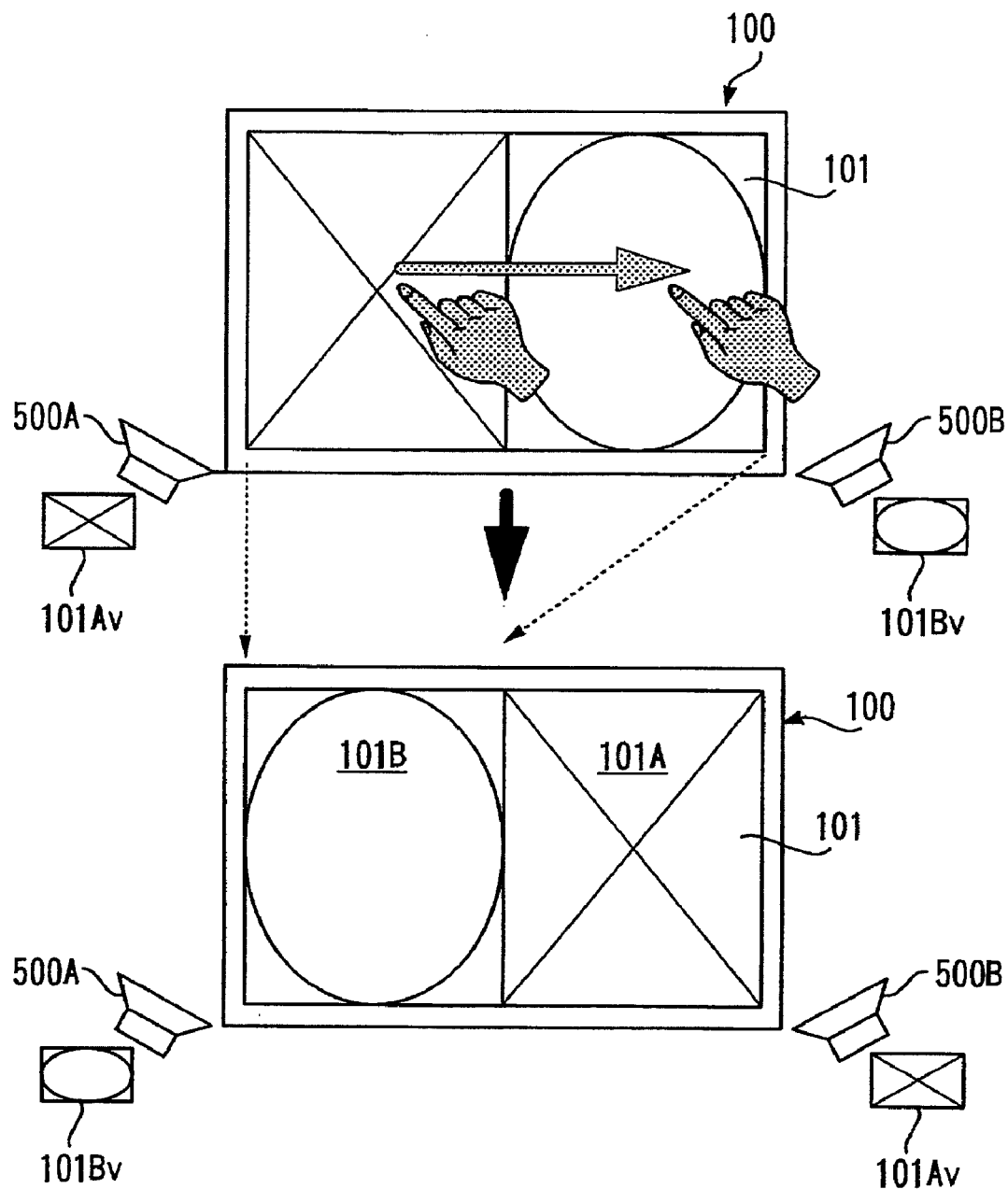
FIG. 18 is a schematic diagram for explaining the operation for switching the left and right speaker audio outputs upon switching the display locations of split images on split screens of a display apparatus left and right, according to an embodiment of the present invention.

Further, as shown in FIG. 18, with wide panel 100 of the present example, when the display locations on display screen 101 of first split screen 101A and second split screen 101B after a screen spit are switched right and left, it is possible to switch audio 101A of the main image and audio 101Bv of the sub-image outputted from left and right speakers 500A and 500B in accordance with each other.

Figure 19:
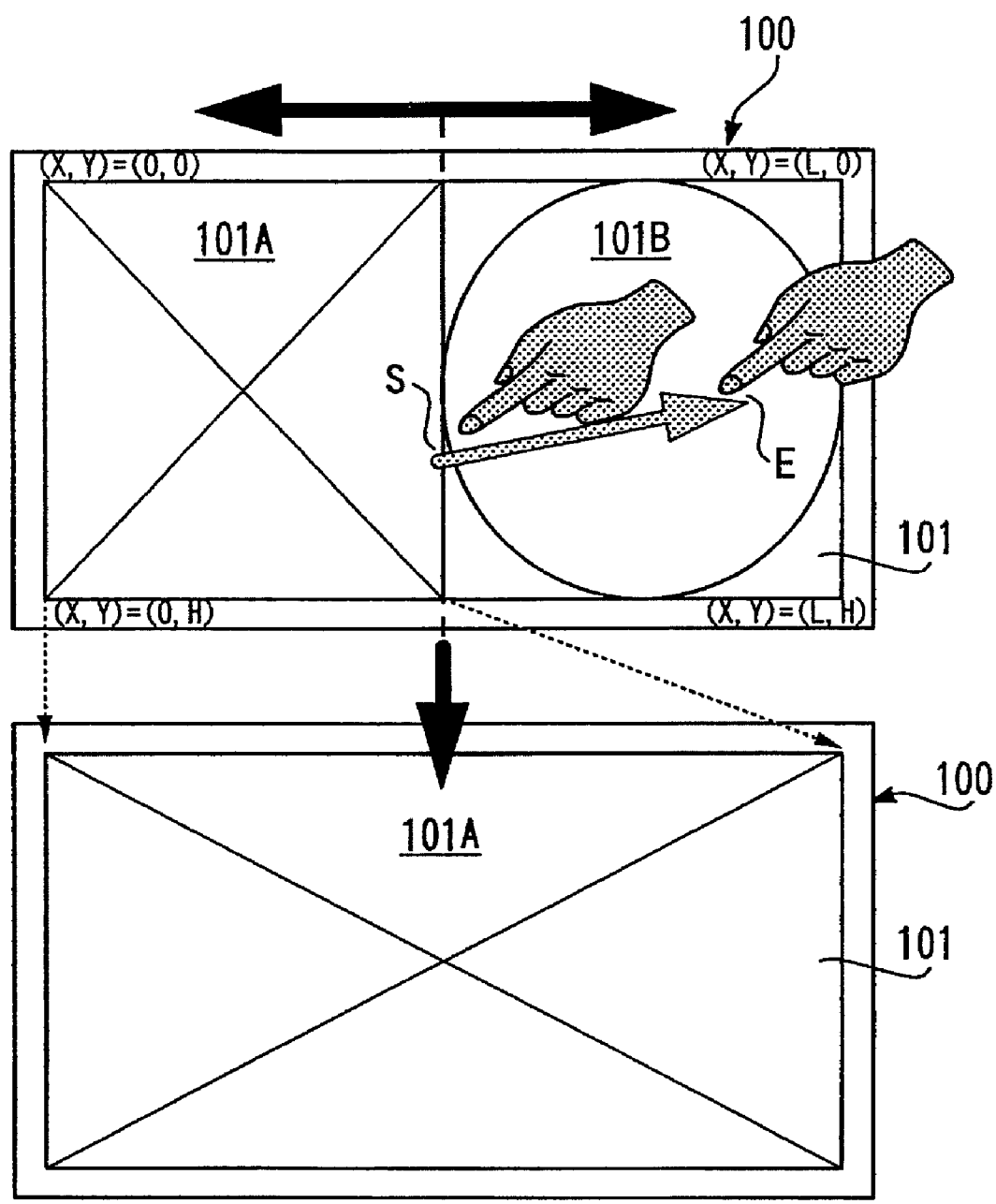
FIG. 19 is a schematic diagram for explaining the operation by the operator to change the split images of the split display screen of a display apparatus to the main image display prior to the screen split, according to an embodiment of the present invention.

Next, the operation performed by the operator when the display images on display screens 101 split as described above are changed to the main image display prior to the screen split, as shown in FIG. 19, will be described.

With wide panel 100 of the present example, when the AND conditions indicated in the following (1) to (6) are met, it is possible to change the display image on the split display screen 101 to the main image display prior to the screen split.

(1) The X coordinate of touch start point S is within a specified range of the coordinate X of the split borderline.

(2) The location shift in the X direction from touch start point S to touch end point E is greater than a specific value. Furthermore, if EX−SX>0, the split screen on the left side expands to a full screen size of display screen 101 (alternatively, the split screen on the right side expands to a full screen size of display screen 101).

(3) After a press starts at touch start point S and the operator's finger is motionless for a short period of time with an image grabbing display screen 101, the operation is started. That is, after a press starts at touch start point S, over a predetermined period of time (about 0.1 second), the press is within a specific range (a number of pixels) from touch start points. This is used to distinguish between the "screen split" operation and the "screen switch" operation. Furthermore, when all these conditions are met, the cursor may change from an "arrow" to a "grabbing hand."

(4) The time that passes from the finger press at touch start point S until the finger is detached at touch end point E, is within a specific range.

(5) The calculated sum of the transfer length in the X and Y direction from touch start point S to touch end point E does not exceed a predetermined specific value (thereby making it possible to exclude cases where the operator's finger draws a curve between touch start point S and touch end point E.)

(6) If the X coordinate of touch end point E is within a specific range from the X coordinate of the display center of display screen 101, the screen size ratio of the left and right split screens is changed. Otherwise, the two screens are made a single screen.

What is claimed is:

1. A display apparatus comprising:
an image display that displays an image on a display screen;
a touch location detector that detects a touch location touched by an operator on the display screen;
a transfer length calculator that calculates a transfer length from a touch start point to a touch end point touched by the operator that moves while touching the display screen, based on a detection result of the touch location detector;
a transfer length judger that judges whether the transfer length calculated by the transfer length calculator is greater than a predetermined reference transfer length;
a location shift calculator that calculates a shift in location touched by the operator with respect to a straight line from the touch start point to the touch end point, based on the detection result of the touch location detector;
a location shift judger that judges whether the location shift calculated by the location shift calculator is less than a predetermined reference location shift; and
a screen split controller that controls the image display so that the display screen is split when the transfer length judger judges that the calculated transfer length is greater than the reference transfer length and the location shift judger judges that the calculated location shift is less than the reference location shift.

2. The display apparatus according to claim 1, further comprising:
a touch duration measurer that measures a touch duration touched by the operator on the display screen; and
a touch duration judger that judges whether the touch duration at the touch start point measured by the touch duration measurement section is less than a predetermined reference touch duration, wherein:
the screen split controller controls the operation of the image display so that the display screen is split when the touch duration judger judges that the measured duration is less than the reference touch duration.

3. The display apparatus according to claim 2, wherein, while the operator touches one of the split screens, if the touch duration judger judges that the touch duration on said one of the split screens measured by the touch duration measurer is greater than the reference touch duration, the screen split controller enables said one of the split screens which the operator touches to be dragged to an other split screen, and controls the image display so that the display locations of images after the screen split are switched by dragging and moving said one of the split screens to the other split screen.

4. The display apparatus according to claim 2, wherein, while the operator touches a split borderline between a first split screen and a second split screen after the screen split, if the touch duration judger judges that the touch duration on said split borderline measured by the touch duration measurer is greater than the reference touch duration, the screen split controller enables said split borderline that the operator touches to be dragged, and controls the image display so as to change the screen sizes of the first and second split screens after the screen split by dragging and moving said split borderline.

5. The display apparatus according to claim 4, further comprising an audio volume adjuster that increases and decreases a first audio volume of the first split screen and a second audio volume of the second split screen split by the screen split controller in accordance with the changed screen sizes changed by the screen split controller.

6. The display apparatus according to claim 1, wherein the screen split controller controls the image display so that display locations of a first split screen and a second split screen after the screen split are determined based on a positional relationship between the touch start point and the touch end point.

7. The display apparatus according to claim 6, wherein the screen split controller displays the first split screen and the second split screen in left and right relative positions when a change in a Y-axis coordinate between the touch start point and the touch end point on the display screen is significant, and displays the first split screen and the second split screen in top and bottom relative positions when a change in a X-axis coordinate between the touch start point and the touch end point on the display screen is significant.

8. The display apparatus according to claim 7, wherein the screen split controller controls the image display so that the display screen is split by a line that crosses a screen center of the display screen when the touch start point and the touch end point are not within a predetermined range from the screen center.

9. The display apparatus according to claim 8, wherein the screen split controller displays the first and second split screens in left and right relative positions split by a line that crosses a screen center of the display screen when the X-axis coordinates of the touch start point and the touch end point are farther from the screen center than a predetermined distance, and
the screen split controller displays the first and second split screens in top and bottom relative positions split by a line that crosses a screen center of the display screen when the Y-axis coordinates of the touch start point and the touch end point are farther from the screen center than a predetermined distance.

10. The display apparatus according to claim 1, wherein, the display apparatus is mounted in a vehicle comprising a seated location detector that detects in which seat location a passenger is seated, and the screen split controller controls the image display so that a new image after the screen split is displayed on a split screen that is closer to the seat location of the operator detected by the seated location detector.

11. A display method comprising:
displaying an image on a display screen;
detecting a touch location touched by an operator on the display screen;
calculating a transfer length from a touch start point to a touch end point touched by the operator that moves while touching the display screen, based on the detected touch location;
judging whether the calculated transfer length is greater than a predetermined reference transfer length;
calculating a shift in location touched by the operator with respect to a straight line from the touch start point to the touch end point, based on the detected touch location;
judging whether the calculated location shift is less than a predetermined reference location shift; and
controlling displaying an image on the display screen so that the display screen is split when the calculated transfer length is judged greater than the reference transfer length and the calculated location shift is judged less than the reference location shift.

12. The display method according to claim 11, further comprising:
detecting whether the touch start point and the touch end point are within a predetermined range from the screen center; and
controlling displaying an image on the display screen so that the display screen is split by a line that crosses a screen center of the display screen when the touch start point and the touch end point are not within the predetermined range from the screen center.

* * * * *